(12) United States Patent
Yang et al.

(10) Patent No.: US 9,952,727 B2
(45) Date of Patent: Apr. 24, 2018

(54) TOUCH PANEL, DISPLAY DEVICE AND TOUCH DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Hailin Xue, Beijing (CN); Weijie Zhao, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 14/903,071

(22) PCT Filed: Jul. 10, 2015

(86) PCT No.: PCT/CN2015/083699
§ 371 (c)(1),
(2) Date: Jan. 6, 2016

(87) PCT Pub. No.: WO2016/119408
PCT Pub. Date: Aug. 4, 2016

(65) Prior Publication Data
US 2016/0224150 A1    Aug. 4, 2016

(30) Foreign Application Priority Data
Jan. 29, 2015  (CN) .......................... 2015 1 0048103

(51) Int. Cl.
*G06F 3/044* (2006.01)

(52) U.S. Cl.
CPC .................................. *G06F 3/044* (2013.01)

(58) Field of Classification Search
CPC ....................................................... G06F 3/044
See application file for complete search history.

(56) References Cited

U.S. PATENT DOCUMENTS

| 2012/0182253 | A1 | 7/2012 | Brosnan |
| 2015/0002446 | A1* | 1/2015 | Ayzenberg .............. G06F 3/044 345/174 |
| 2015/0346839 | A1* | 12/2015 | Kawaguchi ........... G06F 3/0202 345/168 |

FOREIGN PATENT DOCUMENTS

| CN | 101566895 A | 10/2009 |
| CN | 103926729 A | 7/2014 |

(Continued)

OTHER PUBLICATIONS

Chinese Office Action dated Feb. 3, 2017.
(Continued)

*Primary Examiner* — Latanya Bibbins
(74) *Attorney, Agent, or Firm* — Dilworth & Barrese, LLP; Michael J. Musella, Esq.

(57) ABSTRACT

A touch panel, a display device and a touch driving method are disclosed. The touch panel includes a plurality of first self-capacitance electrodes. The plurality of first self-capacitance electrodes are at least distributed in two areas; the first self-capacitance electrodes at corresponding positions in the at least two areas are electrically connected with each other; and at least one in each group of electrically connected first self-capacitance electrodes corresponds to one row-scanning electrodes, which is configured to determine the touch condition of each first self-capacitance electrode in the same group of electrically connected first self-capacitance elec- (Continued)

trodes. The disclosure reduces the total amount of leads and hence reduces touch blind areas and is favorable to a narrow-bezel design.

20 Claims, 2 Drawing Sheets

(56) References Cited

FOREIGN PATENT DOCUMENTS

| | | |
|---|---|---|
| CN | 104020906 A | 9/2014 |
| CN | 104035639 A | 9/2014 |
| CN | 104298409 A | 1/2015 |
| CN | 104767862 A | 1/2015 |
| CN | 104571767 A | 4/2015 |
| WO | 2012033058 A1 | 3/2012 |

OTHER PUBLICATIONS

International Search Report and Written Opinion dated Sep. 29, 2015.
Chinese Office Action dated Aug. 18, 2017.

\* cited by examiner

TOUCH PANEL, DISPLAY DEVICE AND TOUCH DRIVING METHOD

TECHNICAL FIELD

At least one embodiment of the present disclosure relates to a touch panel, a display device and a touch driving method.

BACKGROUND

With the rapid development of display technology, touch panels have been widely applied in people's life. The touch panels may be divided into add-on mode touch panels, in which touch structures and protective glass sheets on the outside of display panels are integrated together, and embedded touch panels, in which touch structures and display panels are integrated together. The embedded touch panels include on-cell touch panels and in-cell touch panels. In an on-cell touch panel, a touch structure is disposed on one side of an opposing substrate of the display panel, away from an array substrate thereof. In an in-cell touch panel, for instance, a touch structure is disposed on one side of an opposing substrate of the display panel, facing an array substrate thereof.

Currently, most touch panels are capacitive touch panels which may be divided into touch panels that utilize the mutual-capacitance principle and touch panels that utilize the self-capacitance principle. Compared with the touch panels that utilize the mutual-capacitance principle, the touch panels that utilize the self-capacitance principle are more suitable for the in-cell touch panels due to high touch sensing accuracy and signal-to-noise ratio thereof and hence gradually become new research focus.

A touch panel that utilizes the self-capacitance principle generally comprises a plurality of self-capacitance electrodes which are arranged in a same layer and insulated from each other, and each self-capacitance electrode is connected to a touch detection chip through a lead. When a human body does not touch the screen, the capacitance of the self-capacitance electrode is at a fixed value. When the human body touches the screen, the capacitance of that self-capacitance electrode(s) corresponding to a touch position is at a value of the fixed value plus the body capacitance, and the touch detection chip can determine the touch position by detecting the variation of the capacitance value of the self-capacitance electrode(s).

SUMMARY

At least one embodiment of the present disclosure provides a touch panel, a display device and a touch driving method, so as to reduce the total amount of leads and hence reduce touch blind areas and be favorable to a narrow-bezel design.

At least one embodiment of the present disclosure provides a touch panel, which comprises a touch structure. The touch structure includes: at least one row of first self-capacitance electrodes disposed in a first area and at least one row of first self-capacitance electrodes disposed in a second area, in which each row of first self-capacitance electrodes include a plurality of first self-capacitance electrodes; the at least one row of first self-capacitance electrodes in the first area correspond to the at least one row of first self-capacitance electrodes in the second area; and each first self-capacitance electrode in the first area and the corresponding first self-capacitance electrode disposed in the second area are electrically connected with each other. The touch structure further includes: at least one row-scanning electrode disposed in the first area and/or the second area, in which each row-scanning electrode corresponds to one row of first self-capacitance electrodes, includes a body portion extended along the extension direction of the one row of first self-capacitance electrodes corresponding to the row-scanning electrode, and is adjacent to and insulated from the corresponding first self-capacitance electrodes. At least one in each group of mutually electrically connected two first self-capacitance electrodes corresponds to the row-scanning electrode.

At least one embodiment of the present disclosure further provides a display device, which comprises the foregoing touch panel.

At least one embodiment of the present disclosure further provides a touch driving method. The method comprises: detecting signals of at least one row of first self-capacitance electrodes disposed in the first area and at least one row of first self-capacitance electrodes disposed in the second area, of the touch structure. In the step, the first self-capacitance electrodes in the first area and the first self-capacitance electrodes in the second area correspond to each other; and each first self-capacitance electrode in the first area is electrically connected with corresponding first self-capacitance electrode in the second area. The method further comprises: detecting signals of at least one row-scanning electrode, disposed in the first area and/or the second area, of the touch structure, so as to determine which one in each group of mutually electrically connected first self-capacitance electrodes is touched. In the step, at least one in each group of mutually electrically connected first self-capacitance electrodes corresponds to the row-scanning electrode; and each row-scanning electrode corresponds to one row of first self-capacitance electrodes, includes a body portion extended along the extension direction of the one row of first self-capacitance electrodes corresponding to the row-scanning electrode, and is adjacent to and insulated from the first self-capacitance electrodes corresponding to the row-scanning electrode.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which may also be correspondingly changed when the absolute position of a described object is changed.

Figure 1:
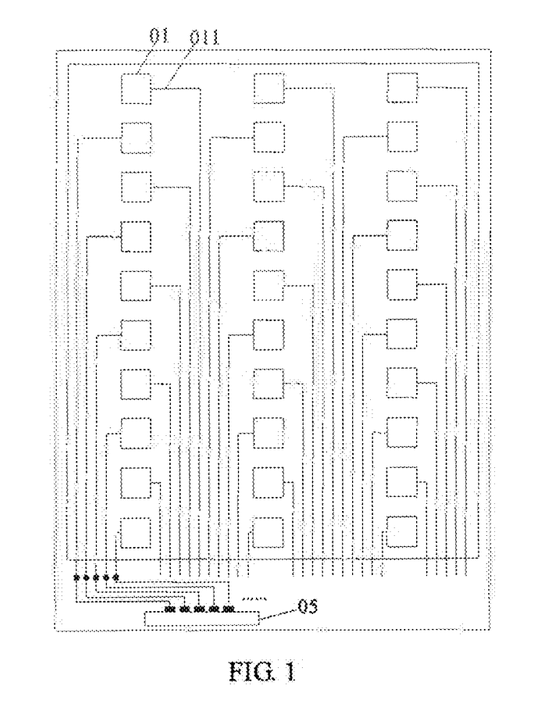
FIG. 1 is a schematic diagram of a touch structure utilizing the self-capacitance principle.

FIG. 1 is a schematic diagram of a touch structure utilizing the self-capacitance principle. As illustrated in FIG. 1, the touch structure comprises a plurality of self-capacitance electrodes 01 arranged in an array, and each self-capacitance electrode 01 is electrically connected with a touch detection chip 05 through an independent lead 011. In practice, because the number of the self-capacitance electrodes 01 is very large, the number of the corresponding leads 011 is also very large. Taking the case that the occupied area of each self-capacitance electrode is 5 mm*5 mm as an example, a 5-inch liquid crystal display (LCD) approximately requires 264 self-capacitance electrodes, and the number of corresponding leads is also about 264. Illustration is given in FIG. 1 in which 30 self-capacitance electrodes are taken as an example.

The inventors of the present application found in the study that: if a plurality of leads are arranged in a bezel area, narrow-bezel design cannot be conveniently achieved and a large touch blind area (namely an area with concentrated wirings in the touch panel) tends to occur; and signals in the touch blind area are relatively disordered, and hence the touch performance cannot be guaranteed.

At least one embodiment of the present disclosure provides a touch panel, a display device and a touch driving method. The touch panel provided by an embodiment of the present disclosure comprises a plurality of first self-capacitance electrodes. The first self-capacitance electrodes are distributed in at least two areas. The first self-capacitance electrodes at corresponding positions in the at least two areas are electrically connected with each other. At least one in each group of electrically connected first self-capacitance electrodes corresponds to a row-scanning electrode, which is used for determining the touch condition of each first self-capacitance electrode in the same group of electrically connected first self-capacitance electrodes. The touch panel provided by the embodiment of the present disclosure reduces the total number of leads and hence reduces the touch blind area and is favorable to a narrow-bezel design.

Figure 2:
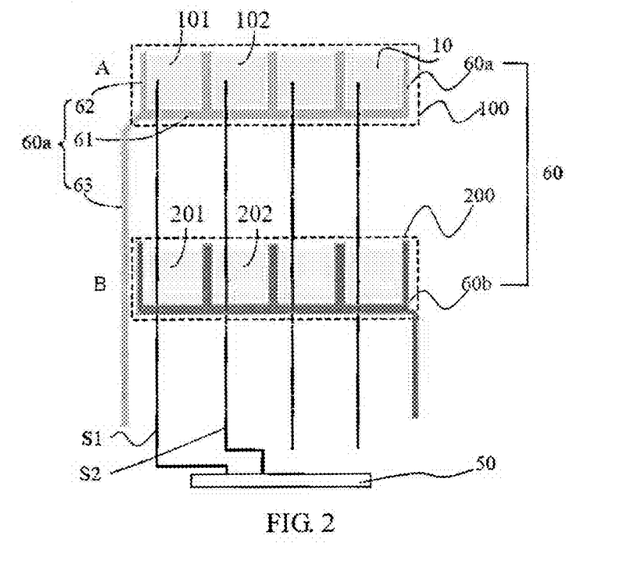
FIG. 2 is a top view of a touch panel provided by an embodiment of the present disclosure.

At least one embodiment of the present disclosure provides a touch panel, which comprises a touch structure. As illustrated in FIG. 2, the touch structure includes at least one row of first self-capacitance electrodes disposed in a first area 100 (for instance, a plurality of rows of A are provided, and A represents one row of first self-capacitance electrodes disposed in the first area 100), at least one row of first self-capacitance electrodes disposed in a second area 200 (for instance, a plurality of rows of B are provided, and B represents one row of first self-capacitance electrodes disposed in the second area 200), and at least one row-scanning electrode 60 disposed in the first area 100 and/or the second area 200, namely at least one row-scanning electrode 60 disposed in the first area 100 or the second area 200, or at least one row-scanning electrode 60 disposed in the first area 100 and at least one row-scanning electrode 60 disposed in the second area 200 (for instance, row-scanning electrodes 60a and 60b disposed in the first area and the second area respectively). In the illustrated example, a plurality of first self-capacitance electrodes 10 in each area are arranged in one row along, for instance, the horizontal direction sequentially; the first self-capacitance electrodes in the first area 100 correspond to the first self-capacitance electrodes in the second area 200; and each first self-capacitance electrode in the first area 100 and the corresponding first self-capacitance electrode disposed in the second area 200 are arranged along, for instance, the vertical direction and electrically connected with each other. At least one in each group of mutually electrically connected two first self-capacitance electrodes is provided with a corresponding row-scanning electrode, so that the two first self-capacitance electrodes can be distinguished and hence which one is touched can be determined. Illustration is given in FIG. 2 by taking the case that each group of mutually electrically connected two first self-capacitance electrodes respectively correspond to the row-scanning electrodes 60a and 60b as an example. Each row-scanning electrode 60 corresponds to one row of first self-capacitance electrodes, includes a body portion 61 extended along the extension direction (e.g., the horizontal direction) of one row of first self-capacitance electrodes corresponding to this row-scanning electrode, and is adjacent to and insulated from the corresponding first self-capacitance electrodes.

It should be noted that: in the embodiment of the present disclosure, the first self-capacitance electrodes in the first area corresponding to the first self-capacitance electrodes in the second area means that each first self-capacitance electrode in the first area only corresponds to one first self-capacitance electrode in the second area and each first self-capacitance electrode in the second area only corresponds to one first self-capacitance electrode in the first area. Moreover, the first self-capacitance electrodes in each row or each area may be regularly distributed and may also be irregularly distributed.

In the embodiment of the present disclosure, the row-scanning electrode being adjacent to a specific first self-capacitance electrode means that when the first self-capacitance electrode is touched, the row-scanning electrode is also simultaneously touched or a signal thereof is also affected.

Illustration is given in FIG. 2 by taking the case that each row of first self-capacitance electrodes are arranged along the horizontal direction and each group of electrically connected first self-capacitance electrodes are arranged along the vertical direction as an example. But the arrangement directions of each row of first self-capacitance electrodes and each group of electrically connected first self-capacitance electrodes are not limited in the embodiment of the present disclosure. For instance, alternatively each row of first self-capacitance electrodes may be arranged along the vertical direction and each group of electrically connected first self-capacitance electrodes may also be arranged along the horizontal direction. For instance, each row of first self-capacitance electrodes may be arranged in a straight line and may also be arranged in a fold line; and each group of electrically connected first self-capacitance electrodes may be arranged in a straight line and may also be arranged in a fold line.

In the embodiment of the present disclosure, at least one in each group of mutually electrically connected two first self-capacitance electrodes corresponding to the row-scanning electrode means that: as for each group of mutually electrically connected two first self-capacitance electrodes, one in the two first self-capacitance electrodes corresponds to a row-scanning electrode (hereinafter referred to as first arrangement) or each in the two first self-capacitance electrode corresponds to a line-scanning line (hereinafter referred to as second arrangement). Moreover, as for a plurality of groups of mutually electrically connected first self-capacitance electrodes: all the groups may adopt the first arrangement. In this case, if all the first self-capacitance electrodes corresponding to the row-scanning electrode are disposed in the first area or the second area, correspondingly, only the first area or the second area is provided with the row-scanning electrode. Or all the groups may adopt the second arrangement. In this case, both the first area and the second area are provided with the row-scanning electrodes. Or one part of groups adopts the first arrangement and the other part of groups adopts the second arrangement.

In the embodiment of the present disclosure, each row-scanning electrode corresponding to one row of first self-capacitance electrodes means that each row-scanning electrode is not adjacent to other rows of first self-capacitance electrodes. In this way, when the variation of the signal of the row-scanning electrode is detected, it may be directly determined that at least one in the first self-capacitance electrodes corresponding to the row-scanning electrode is touched, so that the coordinate of the touch position along one direction can be directly acquired and the coordinate of the touch position along another direction can be acquired through a lead connected with the touched first self-capacitance electrode, and hence the coordinate of the touch position can be obtained.

As illustrated in FIG. 2, the touch panel may further comprise a controller 50 for determining a touch position. The row-scanning electrodes 60a and 60b are electrically connected with the controller 50 through lead-out portions 63 thereof. For instance, the controller 50 may be a touch detection chip, for instance, implemented as an integrated circuit (IC). For instance, the lead-out portion 63 of the row-scanning electrode 60 may be integrally formed with the body portion 61 thereof, so that the technological process can be reduced.

As illustrated in FIG. 2, first self-capacitance electrodes that are electrically connected and disposed at positions 101 and 201 are electrically connected with the controller 50 through the same lead S1; first self-capacitance electrodes that are electrically connected and disposed at positions 102 and 202 are electrically connected with the controller 50 through the same lead S2; and other electrodes corresponding to each other are also electrically connected correspondingly. Compared with the arrangement as shown in FIG. 1 in which one self-capacitance electrode corresponds to one lead, in the embodiment as shown in FIG. 2, the number of the leads for connecting the first self-capacitance electrodes is reduced by half. Meanwhile, due to the additional arrangement of the row-scanning electrodes 60a and 60b, the row-scanning electrodes include the lead-out portions 63, which is equivalent to the addition of two leads. Therefore, the touch panel provided by the embodiment of the present disclosure can reduce the total number of the leads.

In the embodiment of the present disclosure, because the first self-capacitance electrodes disposed in different areas are electrically connected with each other, the number of the leads can be reduced; and because at least one in the electrically connected two first self-capacitance electrodes corresponds to the row-scanning electrode, it can be distinguished which one in the two first self-capacitance electrodes is touched. For instance, as illustrated in FIG. 2, when the first self-capacitance electrode disposed at the position 101 is touched, the lead S1 is detected to have a touch signal. In another aspect, as the row-scanning electrode 60a is adjacent to this first self-capacitance electrode, the row-scanning electrode 60a is also touched or affected and hence is also detected to have a touch signal, but the row-scanning electrode 60b is not touched and not affected because it is far away from the first self-capacitance electrode. Therefore, the horizontal coordinate of the touch position can be determined through the lead S1; and which one in the first self-capacitance electrodes disposed at the positions 101 and 201 is touched may be determined through the row-scanning electrodes 60a and 60b, and hence the vertical coordinate of the touch position can be obtained. Of course, which one in the first self-capacitance electrodes disposed at the positions 101 and 201 is touched may also be determined only through the row-scanning electrode 60a or 60b, and further description to this way will not be given here. Similarly, when another first self-capacitance electrode is touched, the horizontal coordinate and the vertical coordinate of the touch position can be respectively obtained through a corresponding lead and a corresponding row-scanning electrode.

In at least one embodiment, for the row-scanning electrode to be more easily touched, as illustrated in FIG. 2, the row-scanning electrode 60 may further include at least one projection 62 projected from the body portion 61. The projection 62 is disposed in at least one gap between the first self-capacitance electrodes corresponding to the row-scanning electrode. For instance, the projection 62 of the row-scanning electrode 60a is disposed in a gap between the first self-capacitance electrodes represented by A; and correspondingly, the projection of the row-scanning electrode 60b is disposed in a gap between the first self-capacitance electrodes represented by B.

In at least one embodiment, in order to reduce the technological process, the row-scanning electrodes (e.g., the row-scanning electrodes 60a and 60b) may be arranged in the same layer as the first self-capacitance electrodes, namely patterns of the row-scanning electrodes and patterns of the first self-capacitance electrodes may be formed by the same patterning process (e.g., including steps such as exposure, development, etching, etc.); and the row-scanning electrodes and the first self-capacitance electrodes are disconnected and subsequently filled by an insulating layer to achieve mutual insulation. Of course, the embodiment of the present disclosure is not limited thereto.

In the embodiment of the present disclosure, supposing that both the first area and the second area are respectively provided with N first self-capacitance electrodes arranged in one row, the first self-capacitance electrodes at corresponding positions in the two areas are electrically connected with each other. As illustrated in FIG. 2, when N=2, if the first arrangement is adopted, the number of the leads can be reduced by N−1=2−1=1 in total; and if the second arrangement is adopted, the reduced number of the leads is equal to the number of the applied row-scanning electrodes, so that the effect of reducing the total number of the leads cannot be achieved. When N≥3, the first arrangement or the second arrangement may be adopted; when the first arrangement is adopted, the number of the leads can be reduced by N−1 in total; and when the second arrangement is adopted, the number of the leads can be reduced by N−2 in total. Therefore, when the number of the first self-capacitance electrodes of each area is larger (namely N is larger), the number of leads is reduced to a larger extent in total; the proportion of the reduced leads is (N−1)/2N=0.5−1/2N or (N−2)/2N=0.5-1/N; and when N is larger, the proportion of the reduced leads is close to 50%. Therefore, the touch panel provided by the embodiment of the present disclosure can effectively reduce the total number of the required leads.

When both the first area and the second area are provided with N first self-capacitance electrodes that are arranged in one row, N groups of mutually electrically connected first self-capacitance electrodes are provided in total. If the first self-capacitance electrode rows respectively in the two areas are adjacent to each other, as for each group of mutually electrically connected first self-capacitance electrodes, when one first self-capacitance electrode in the group is touched, the capacitance of the other first self-capacitance electrode may be affected as well because the first self-capacitance electrode is too close to the touched first self-capacitance electrode, and hence the determination of the touch position can be affected to some extent. Therefore, in at least one embodiment, each group of mutually electrically connected first self-capacitance electrodes is not adjacent to each other (and hence is not affected).

Illustration is given in FIG. 2 by taking the case that both the first area and the second area are respectively provided with one row of first self-capacitance electrodes as an example. But the embodiment of the present disclosure is not limited to this configuration. Each area may also be provided with at least two rows of first self-capacitance electrodes.

For instance, both the first area and the second area are provided with M rows of first self-capacitance electrodes, the rows are arranged along the column direction sequentially, and each row of first self-capacitance electrodes include N first self-capacitance electrodes. The $Nj^{th}$ first self-capacitance electrode in the $Mi^{th}$ row of first self-capacitance electrodes in the first area is electrically connected with the $Nj^{th}$ first self-capacitance electrode in the $Mi^{th}$ row of first self-capacitance electrodes in the second area. In the embodiment of the present disclosure, both M and N are integers which are more than or equal to 2; Mi=2, . . . , M; and Nj=2, 3, 4, . . . , N.

Figure 3:
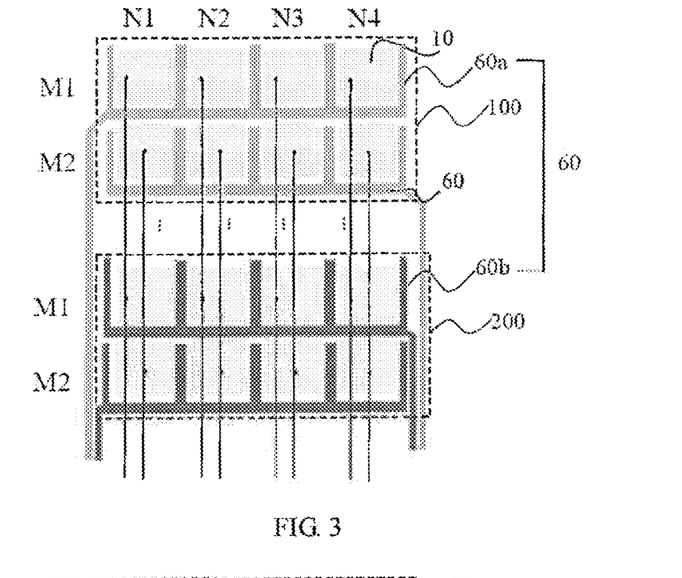
FIG. 3 is a top view of another touch panel provided by the embodiment of the present disclosure.

Illustration is given in FIG. 3 by taking the case that M=2 and N=4 as an example. As illustrated in FIG. 3, each area includes two rows of first self-capacitance electrodes; the first self-capacitance electrodes in the M1 row and the N1 column respectively in the first area 100 and the second area 200 are electrically connected with each other; the first self-capacitance electrodes in the M1 row and the N2 column respectively in the first area 100 and the second area 200 are electrically connected with each other, . . . ; and the first self-capacitance electrodes in other rows and columns respectively in the first area 100 and the second area 200 are electrically connected with each other in a similar corresponding way. In FIG. 3, each first self-capacitance electrode in each group of electrically connected first self-capacitance electrodes corresponds to one row-scanning electrode, namely the second arrangement is adopted. In this case, the first area and the second area as shown in FIG. 3 may be considered as the combination of two structures having the first area and the second area as shown in FIG. 2.

As for the case that both the first area and the second area are provided with one row of first self-capacitance electrodes and each row of first self-capacitance electrodes include N first self-capacitance electrodes, if the set of these two rows of first self-capacitance electrodes is referred to as C, the case that both the first area and the second area in the above embodiment are provided with M rows of first self-capacitance electrodes may be considered as M Cs. As seen from the above embodiment, as for each C: when N=2, if the first arrangement is adopted, one lead may be reduced; if the second arrangement is adopted, the number of reduced leads due to the electrical connection of the first self-capacitance electrodes is equal to the number of the added leads due to the row-scanning electrodes, so that the number of the leads cannot be reduced at this point; when N≥3, if the first arrangement is adopted, N−1 leads may be reduced; and if the second arrangement is adopted, N−2 leads may be reduced. Therefore, as for the M Cs: when N=2, if the second arrangement is adopted for each C, the total number of the leads cannot be reduced, so that at least one C shall adopt the first arrangement to reduce one lead, that is to say, at most 2M−1 first self-capacitance electrodes are provided with corresponding row-scanning electrodes; and when N≥3, all Cs may adopt the second arrangement, or all Cs may adopt the first arrangement, or a part of Cs adopt the second arrangement and the other part of Cs adopt the first arrangement, that is to say, when N≥3, at least one in the $Mi^{th}$ row of first self-capacitance electrodes in the first area and the $Mi^{th}$ row of first self-capacitance electrodes in the second area is provided with corresponding row-scanning electrode.

For instance, when all the M Cs adopt the second arrangement, as illustrated in FIG. 3, the number of the leads may be reduced by M·(N−2) in total, and the proportion of the reduced leads is M·(N−2)/M·2N=0.5-1/N. As can be seen, when N is larger, the case as shown in FIG. 3 may allow the proportion of the reduced leads to be close to 50%. Therefore, the touch panel provided by the embodiment of the present disclosure can effectively reduce the total number of the leads.

It should be noted that: one row of first self-capacitance electrodes represented by A in FIG. 2 may be any row in M rows of first self-capacitance electrodes in the first area; and one row of first self-capacitance electrodes represented by B in FIG. 2 may be any row in M rows of first self-capacitance electrodes in the second area. The M rows of first self-capacitance electrodes being arranged along the column direction sequentially in the above embodiment does not mean that the M rows of first self-capacitance electrodes must be arranged along the column direction according to the sequence of 1, 2, . . . , Mi, M and is only intended to illustrate that the first self-capacitance electrodes in the first area correspond to the first self-capacitance electrodes in the second area. For instance, in FIG. 3, the configuration may also be that: two first self-capacitance electrodes at corresponding positions (corresponding columns) in the $M1^{th}$ row in the first area 100 and the $M2^{th}$ in the second area 200 are electrically connected with each other, and two first self-capacitance electrodes at corresponding positions (corresponding columns) in the $M2^{th}$ row in the first area 100 and the $M1^{th}$ row in the second area 200 are electrically connected with each other.

Figure 4:
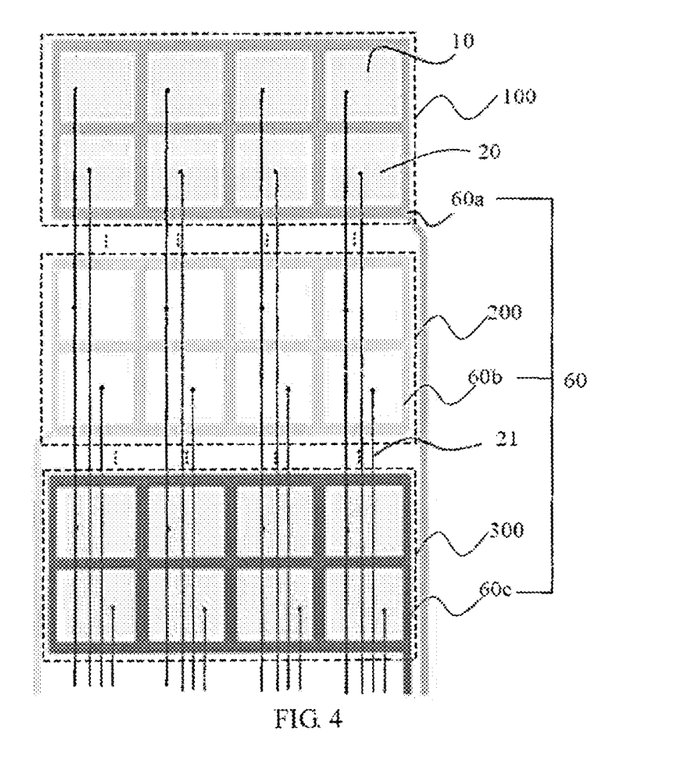
FIG. 4 is a top view of still another touch panel provided by the embodiment of the present disclosure.

In at least one embodiment, as illustrated in FIG. 4, the touch structure may further include a plurality of second self-capacitance electrodes 20; and each second self-capacitance electrode is insulated from other second self-capacitance electrodes, the at least one row-scanning electrode 60 and the first self-capacitance electrodes. Each second self-capacitance electrode is connected to the controller through an independent lead 21 and does not share the same lead with other self-capacitance electrodes. That is to say, in the embodiment of the present disclosure, self-capacitance electrodes electrically connected with other self-capacitance electrodes are referred to as first self-capacitance electrodes 10; self-capacitance electrodes insulated from other self-capacitance electrodes are referred to as second self-capacitance electrodes 20; and each row-scanning electrode 60 is insulated from any self-capacitance electrode. For instance, the second self-capacitance electrodes 20 may be disposed on the outside of the first area 100 and the second area 200 or disposed within the first area 100 and the second area 200 (as shown in FIG. 4). For instance, the second self-capacitance electrodes 20 and the first self-capacitance electrodes 10 may be arranged along the row direction, or the second self-capacitance electrodes 20 and the first self-capacitance electrodes 10 may be arranged along the column direction (as shown in FIG. 4). No limitation will be given in the embodiment of the present disclosure in this aspect.

For instance, as illustrated in FIG. 4, both the first area and the second area are provided with one row of first self-capacitance electrodes and at least one row of second self-capacitance electrodes. But FIG. 4 illustrates only one row of second self-capacitance electrodes. Each row of first self-capacitance electrodes include N first self-capacitance electrodes; the $Nj^{th}$ first self-capacitance electrode in the first area and the $Nj^{th}$ first self-capacitance electrode in the second area are arranged along, for instance, the column direction and are electrically connected with each other; and each row of second self-capacitance electrodes include a plurality of second self-capacitance electrodes. In the embodiment of the present disclosure, N is an integer which is more than or equal to 2, and $Nj=2, 3, \ldots, N$.

In at least one embodiment, as illustrated in FIG. 4, the row-scanning electrode 60 is also adjacent to each second self-capacitance electrode in the area provided with the first self-capacitance electrodes corresponding to this row-scanning electrode. For instance, the row-scanning electrodes 60a and 60b not only are adjacent to the first self-capacitance electrodes in corresponding areas thereof respectively but also are adjacent to the second self-capacitance electrodes in the areas respectively. In the embodiment of the present disclosure, each second self-capacitance electrode is connected to the controller through an independent lead 21, and the controller may directly determine the coordinate of the touch position through the lead 21. On this basis, the second self-capacitance electrodes are adjacent to the row-scanning electrodes, and the coordinate of the touch position may be further determined through the row-scanning electrodes, and hence the touch accuracy can be improved.

In addition, the self-capacitance electrodes in the touch structure may also be divided into at least three areas, as shown in FIG. 4. For instance, the touch electrodes include P areas; each area is provided with M rows of first self-capacitance electrodes arranged along the column direction sequentially; each row of first self-capacitance electrodes include N first self-capacitance electrodes; and the $Nj^{th}$ first self-capacitance electrodes in the $Mi^{th}$ row of first self-capacitance electrodes in the areas are arranged along, for instance, the column direction and are electrically connected with each other. In the embodiment of the present disclosure, P is an integer which is more than or equal to 3; M is an integer which is more than or equal to 1; $Mi=1, 2, \ldots, M$; N is an integer which is more than or equal to 2; and $Nj=2, 3, \ldots, N$.

In the embodiment of the present disclosure, as for the P areas, the first arrangement may be that: P−1 first self-capacitance electrodes in each group of mutually electrically connected P first self-capacitance electrodes correspond to one row-scanning electrode respectively; and the second arrangement may be that: each first self-capacitance electrode in each group of mutually electrically connected P first self-capacitance electrodes corresponds to one row-scanning electrode. In at least one embodiment, when N=2, if all the M·N mutually electrically connected first self-capacitance electrodes adopt the second arrangement, for instance, each row of first self-capacitance electrodes correspond to one row-scanning electrode, the number of the reduced leads due to the electrical connection of the first self-capacitance electrodes is equal to the number of the added leads due to the row-scanning electrodes, and hence the number of the leads cannot be reduced. Therefore, in this way, at most P·M−1 rows of first self-capacitance electrodes are provided with corresponding row-scanning electrodes. When N≥3, M·N electrically connected first self-capacitance electrodes may all adopt the first arrangement, or may all adopt the second arrangement, or a part thereof adopt the first arrangement and the other part adopt the second arrangement. That is to say, at least P−1 first self-capacitance electrodes in each group of mutually electrically connected P first self-capacitance electrodes are provided with corresponding row-scanning electrodes respectively. In the embodiment of the present disclosure, each row-scanning electrode is adjacent to each first self-capacitance electrode in one row of first self-capacitance electrodes corresponding to this row-scanning electrode.

FIG. 4 illustrates 3 areas 100, 200 and 300, and each area is provided with one row of first self-capacitance electrodes and one row of second self-capacitance electrodes. In FIG. 4, each first self-capacitance electrode in each group of electrically connected first self-capacitance electrodes corresponds to a row-scanning electrode, and each row of first self-capacitance electrode corresponds to a row-scanning electrode. That is to say, the second arrangement is adopted, and the row-scanning electrodes (60a, 60b and 60c as shown in FIG. 4) corresponding to one row of first self-capacitance electrodes in each area are adjacent to each first self-capacitance electrode and each second self-capacitance electrode in the area. In this case, as for the P areas, the number of the reduced leads is N·(P−1)−P, and the proportion of the reduced leads is $[N·(P−1)−P]/P·2N=0.5−1/2P−1/2N$. Accordingly, when the arrangement as shown in FIG. 4 is adopted, when P and N are larger numbers, the proportion of the reduced leads is closer to 50%. Therefore, this arrangement can also effectively reduce the number of the leads.

It should be noted that: one row of first self-capacitance electrodes represented by A in FIG. 2 may be disposed in any area among the P areas and may be any row in the M rows of first self-capacitance electrodes in the area; and one row of first self-capacitance electrodes represented by B in FIG. 2 may be disposed in any one of the remaining areas in the P areas and may be any row in the M rows of first self-capacitance electrodes in the area. The M rows of first self-capacitance electrodes being arranged along the column direction sequentially in the embodiment does not mean that the M rows of first self-capacitance electrodes are arranged along the column direction according to the sequence of 1, 2, . . . , Mi, M and is only intended to illustrate that the first self-capacitance electrodes in the P areas correspond to each other. In addition, any area may be provided with only the first self-capacitance electrodes, as shown in FIG. 3; or any area may be provided with the first self-capacitance electrodes and the second self-capacitance electrodes simultaneously, as shown in FIG. 4.

In the embodiment of the present disclosure, in the second arrangement, each first self-capacitance electrode in each group of electrically connected first self-capacitance electrodes corresponds to a row-scanning electrode, so that the touch condition of each first self-capacitance electrode may be directly detected when the second arrangement is adopted, and hence the touch accuracy can be improved and the ghost point problem can be solved. Therefore, as for each group of electrically connected first self-capacitance electrodes, the embodiment of the present disclosure preferably adopts the second arrangement. In this case, each row of first self-capacitance electrodes in the first area and the second area may be adjacent to corresponding row-scanning electrode. When the above-mentioned P (P≥3) areas are provided, each row of first self-capacitance electrodes in each area may be adjacent to corresponding row-scanning electrode.

In the embodiment of the present disclosure, the touch panel may further comprise a base substrate (e.g., a glass substrate). The touch structure is disposed on the base substrate. In this case, the touch panel may further comprise a display panel. The display panel includes an array substrate and an opposing substrate. The base substrate may be disposed on one side of the opposing substrate away from the array substrate, namely in this configuration the touch panel adopts an add-on structure. The touch panel may also adopt an on-cell or in-cell structure. For instance, the touch structure may be disposed on a surface of one side of the opposing substrate in the display panel, away from the array substrate, or the touch structure may be disposed on the opposing substrate or the array substrate.

At least one embodiment of the present disclosure further provides a display device, which comprises the touch panel provided by any foregoing embodiment. The display device may be: any product or component with display function such as LCD panel, E-paper, organic light-emitting diode (OLED) display panel, mobile phone, tablet PC, television set, display, notebook computer, digital picture frame, navigator and so on.

At least one embodiment of the present disclosure further provides a touch driving method. The method comprises: step S detecting signals of at least one row of first self-capacitance electrodes disposed in a first area and at least one row of first self-capacitance electrodes disposed in a second area, which are of a touch structure; and step S2: detecting signals of at least one row-scanning electrode, disposed in the first area and/or the second area, of the touch structure, namely detecting signals of at least one row-scanning electrode disposed in the first area or the second area, or detecting signals of at least one row-scanning electrode disposed in the first area and signals of at least one row-scanning electrode disposed in the second area.

In step S1, the first self-capacitance electrodes in the first area correspond to the first self-capacitance electrodes in the second area, and the first self-capacitance electrodes in the first area and the corresponding first self-capacitance electrode disposed in the second area are electrically connected with each other.

In step S2, the detection of the signals of at least one row-scanning electrode is conducted to determine which one in each group of electrically connected first self-capacitance electrodes is touched. At least one in each group of mutually electrically connected first self-capacitance electrodes corresponds to the row-scanning electrode. Each row-scanning electrode corresponds to one row of first self-capacitance electrodes, includes a body portion extended along the extension direction of the one row of first self-capacitance electrodes corresponding to the row-scanning electrode, and is adjacent to and insulated from the first self-capacitance electrodes corresponding to the row-scanning electrode.

In the touch driving method provided by the embodiment of the present disclosure, the coordinate of the touch position in one direction may be determined through the detection of the signals of the first self-capacitance electrodes; by detection of the signals of the row-scanning electrode, as the row-scanning electrode is adjacent to one of two electrically connected first self-capacitance electrodes, which one in the two first self-capacitance electrodes is touched may be determined, and hence the coordinate of the touch position in the other direction can be determined.

In the embodiment of the present disclosure, in order to determine which one in each group of electrically connected first self-capacitance electrodes is touched, part or all of the group of electrically connected first self-capacitance electrodes may be provided with a row-scanning electrode, and the row-scanning electrode is detected, namely the above first arrangement or the above second arrangement may be adopted. The second arrangement, namely the arrangement in which all in each group of electrically connected first self-capacitance electrodes are provided with a row-scanning electrode, and the row-scanning electrode is detected, may be used to directly detect the touch condition of each first self-capacitance electrode, and hence improve the touch accuracy and solve the ghost problem.

In at least one embodiment, the touch driving method may further comprise: detecting signals of at least one second self-capacitance electrode of the touch structure and determining the touch position of the second self-capacitance electrode according to the detected signal of each second self-capacitance electrode. In the step, each second self-capacitance electrode is insulated from other second self-capacitance electrodes, the at least one row-scanning electrode and the first self-capacitance electrodes. That is to say, as for each second self-capacitance electrode not electrically connected with other self-capacitance electrodes, whether the second self-capacitance electrode is touched may be determined through the direct detection of the variation of the capacitance signal thereof.

The touch driving method provided by the embodiment of the present disclosure further comprises: applying driving signals to the self-capacitance electrodes (e.g., the first self-capacitance electrodes and the second self-capacitance electrodes), connected with leads, through the leads, applying driving signals to the row-scanning electrodes through lead-out portions of the row-scanning electrodes, and receiving feedback signals of the self-capacitance electrodes and the row-scanning electrodes. No further description will be given here in this way.

In the touch driving method provided by the embodiment of the present disclosure, the arrangement of the first self-capacitance electrodes, the second self-capacitance electrodes, the row-scanning electrodes and the like and the first arrangement and the second arrangement may refer to the description of the embodiments of the touch panel. No further description will be given here.

The foregoing is only the preferred embodiments of the present disclosure and not intended to limit the scope of protection of the present disclosure. The scope of protection of the present disclosure should be defined by the appended claims.

The application claims priority to the Chinese patent application No. 201510048103.X, filed Jan. 29, 2015, the disclosure of which is incorporated herein by reference as part of the application.

The invention claimed is:

1. A touch panel, comprising a touch structure comprising:
   at least one row of first self-capacitance electrodes disposed in a first area and at least one row of first self-capacitance electrodes disposed in a second area, in which each row of first self-capacitance electrodes comprise a plurality of first self-capacitance electrodes; the at least one row of first self-capacitance electrodes in the first area correspond to the at least one row of first self-capacitance electrodes in the second area; each first self-capacitance electrode in the first area and the corresponding first self-capacitance electrode disposed in the second area are electrically connected with each other; and
   at least one row-scanning electrode disposed in the first area and/or the second area, in which each row-scanning electrode corresponds to one row of first self-capacitance electrodes, comprises a body portion extended along the extension direction of the one row of first self-capacitance electrodes corresponding to the row-scanning electrode, and is adjacent to and insulated from the corresponding first self-capacitance electrodes;
   wherein at least one in each group of mutually electrically connected two first self-capacitance electrodes corresponds to the row-scanning electrode; and the body portion of each row-scanning electrode is in an integrated structure and is adjacent to each of the first self-capacitance electrodes in a same row.

2. The touch panel according to claim 1, wherein each row of first self-capacitance electrodes in the first area and the second area correspond to one row-scanning electrode.

3. The touch panel according to claim 2, wherein the row-scanning electrode further comprises at least one projection projected from the body portion; and the at least one projection is disposed in at least one gap between the first self-capacitance electrodes corresponding to the row-scanning electrode.

4. The touch panel according to claim 2, wherein both the first area and the second area are provided with M rows of first self-capacitance electrodes arranged along a column direction sequentially; each row of first self-capacitance electrodes comprises N first self-capacitance electrodes; an $Nj^{th}$ first self-capacitance electrode in an $Mi^{th}$ row of first self-capacitance electrodes in the first area is electrically connected with an $Nj^{th}$ first self-capacitance electrode in an $Mi^{th}$ row of first self-capacitance electrodes in the second area; wherein both M and N are integers which are more than or equal to 2; $Mi=2, \ldots, M$; and $Nj=2, 3, 4, \ldots, N$.

5. The touch panel according to claim 1, wherein each group of mutually electrically connected first self-capacitance electrodes are not adjacent to each other.

6. The touch panel according to claim 1, wherein the row-scanning electrode further comprises at least one projection projected from the body portion; and the at least one projection is disposed in at least one gap between the first self-capacitance electrodes corresponding to the row-scanning electrode.

7. The touch panel according to claim 1, further comprising a controller for determining a touch position, wherein the row-scanning electrode further comprises a lead-out portion and is electrically connected with the controller through the lead-out portion.

8. The touch panel according to claim 1, wherein the row-scanning electrode and the first self-capacitance electrodes are arranged in a same layer.

9. The touch panel according to claim 1, wherein both the first area and the second area are provided with M rows of first self-capacitance electrodes arranged along a column direction sequentially; each row of first self-capacitance electrodes comprises N first self-capacitance electrodes; an $Nj^{th}$ first self-capacitance electrode in an $Mi^{th}$ row of first self-capacitance electrodes in the first area is electrically connected with an $Nj^{th}$ first self-capacitance electrode in an $Mi^{th}$ row of first self-capacitance electrodes in the second area; wherein both M and N are integers which are more than or equal to 2; $Mi=2, \ldots, M$; and $Nj=2, 3, 4, \ldots, N$.

10. The touch panel according to claim 9, wherein when N=2, at most $2 \cdot M - 1$ rows of first self-capacitance electrodes are provided with corresponding row-scanning electrodes; and
   when $N \geq 3$, at least one row in the $Mi^{th}$ row of first self-capacitance electrodes in the first area and the $Mi^{th}$ row of first self-capacitance electrodes in the second area is provided with corresponding row-scanning electrode.

11. The touch panel according to claim 9, wherein the touch structure further comprises a plurality of second self-capacitance electrodes; and each second self-capacitance electrode is insulated from other second self-capacitance electrodes, the at least one row-scanning electrodes and the first self-capacitance electrodes.

12. The touch panel according to claim 1, wherein the touch structure further comprises a plurality of second self-capacitance electrodes; and each second self-capacitance electrode is insulated from other second self-capacitance electrodes, the at least one row-scanning electrode and the first self-capacitance electrodes.

13. The touch panel according to claim 12, wherein both the first area and the second area are provided with one row of first self-capacitance electrodes and at least one row of second self-capacitance electrodes; and each row of second self-capacitance electrodes comprise a plurality of second self-capacitance electrodes.

14. The touch panel according to claim 13, wherein the row-scanning electrode is also adjacent to each second self-capacitance electrode in the area provided with the one row of first self-capacitance electrodes corresponding to the row-scanning electrode.

15. The touch panel according to claim 1, wherein the touch electrodes comprise P areas; each area is provided with M rows of first self-capacitance electrodes arranged along a column direction sequentially; each row of first self-capacitance electrodes comprise N first self-capacitance electrodes; an $Nj^{th}$ first self-capacitance electrodes in an $Mi^{th}$ row of first self-capacitance electrodes in the areas are electrically connected with each other; wherein P is an integer which is more than or equal to 3; M is an integer which is more than or equal to 1; $Mi=1$, 2, . . . , M; N is an integer which is more than or equal to 2; and Nj=2, 3, . . . , N.

16. The touch panel according to claim 15, wherein
when N=2, at most P·M−1 rows of first self-capacitance electrodes are provided with corresponding row-scanning electrodes; and
when N≥3, at least P−1 first self-capacitance electrodes in each group of mutually electrically connected P first self-capacitance electrodes are respectively provided with corresponding row-scanning electrodes.

17. A display device, comprising the touch panel according to claim 1.

18. A touch driving method, comprising:
detecting signals of at least one row of first self-capacitance electrodes disposed in a first area and signals of at least one row of first self-capacitance electrodes disposed in a second area, which are of the touch structure, in which the first self-capacitance electrodes in the first area and the first self-capacitance electrodes in the second area correspond to each other; each first self-capacitance electrode in the first area is electrically connected with corresponding first self-capacitance electrode in the second area; and
detecting signals of at least one row-scanning electrode, disposed in the first area and/or the second area, of the touch structure, so as to determine which one in each group of mutually electrically connected first self-capacitance electrodes is touched, in which at least one in each group of mutually electrically connected first self-capacitance electrodes corresponds to the row-scanning electrode; and each row-scanning electrode corresponds to one row of first self-capacitance electrodes, comprises a body portion extended along the extension direction of the one row of first self-capacitance electrodes corresponding to the row-scanning electrode, and is adjacent to and insulated from the first self-capacitance electrodes corresponding to the row-scanning electrode,
wherein the body portion of each row-scanning electrode is in an integrated structure and is adjacent to each of the first self-capacitance electrodes in a same row.

19. The touch driving method according to claim 18, further comprising:
detecting signals of a plurality of second self-capacitance electrodes of the touch structure and determining whether the second self-capacitance electrode is touched according to the detected signal of each second self-capacitance electrode,
wherein each second self-capacitance electrode is insulated from other second self-capacitance electrodes, the at least one row-scanning electrode and the first self-capacitance electrodes.

20. A touch panel, comprising a touch structure comprising:
a plurality of rows of first self-capacitance electrodes disposed in a first area and a plurality of rows of first self-capacitance electrodes disposed in a second area, in which each row of first self-capacitance electrodes comprise a plurality of first self-capacitance electrodes; the plurality of rows of first self-capacitance electrodes in the first area correspond to the plurality of rows of first self-capacitance electrodes in the second area; each first self-capacitance electrode in the first area and the corresponding first self-capacitance electrode disposed in the second area are electrically connected with each other; and
at least one row-scanning electrode disposed in the first area and/or the second area, in which each row-scanning electrode corresponds to one row of first self-capacitance electrodes, comprises a body portion extended along the extension direction of the one row of first self-capacitance electrodes corresponding to the row-scanning electrode, and is adjacent to and insulated from the corresponding first self-capacitance electrodes;
wherein at least one in each group of two first self-capacitance electrodes which are mutually electrically connected corresponds to the row-scanning electrode; and in a column direction, the body portion of the row-scanning electrode is between adjacent ones of the first self-capacitance electrodes.

\* \* \* \* \*